United States Patent
Meixner (10) Patent No.: US 9,669,710 B2
(45) Date of Patent: Jun. 6, 2017

(54) DRIVE TRAIN OF A MOTOR VEHICLE

(71) Applicant: AUDI AG, Ingolstadt (DE)

(72) Inventor: Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/909,406

(22) PCT Filed: Jul. 16, 2014

(86) PCT No.: PCT/EP2014/001943
§ 371 (c)(1),
(2) Date: Feb. 1, 2016

(87) PCT Pub. No.: WO2015/014449
PCT Pub. Date: Feb. 5, 2015

(65) Prior Publication Data
US 2016/0159214 A1    Jun. 9, 2016

(30) Foreign Application Priority Data

Aug. 2, 2013 (DE) ......................... 10 2013 012 947

(51) Int. Cl.
| | |
|---|---|
| *F16H 3/74* | (2006.01) |
| *B60K 17/16* | (2006.01) |
| *B60K 17/346* | (2006.01) |
| *B60K 23/08* | (2006.01) |
| *F16H 48/11* | (2012.01) |

(Continued)

(52) U.S. Cl.
CPC ........ *B60K 17/165* (2013.01); *B60K 17/3462* (2013.01); *B60K 17/35* (2013.01); *B60K 23/0808* (2013.01); *F16H 37/0813* (2013.01); *F16H 48/10* (2013.01); *F16H 48/11* (2013.01); *F16H 48/22* (2013.01); *B60K 2023/0816* (2013.01)

(58) Field of Classification Search
None
See application file for complete search history.

(56) References Cited

U.S. PATENT DOCUMENTS

| | | | |
|---|---|---|---|
| 6,523,633 B1 | 2/2003 | Teraoka et al. | |
| 6,645,109 B2 * | 11/2003 | Williams | ........... B60K 17/3465 180/248 |

(Continued)

FOREIGN PATENT DOCUMENTS

| | | |
|---|---|---|
| DE | 763 906 | 5/1943 |
| DE | 1 059 299 | 5/1956 |

(Continued)

OTHER PUBLICATIONS

International Search Report issued by the European Patent Office in International Application PCT/EP2014/001943.

*Primary Examiner* — Dirk Wright
(74) *Attorney, Agent, or Firm* — Henry M. Feiereisen LLC (57) ABSTRACT

A drive train of a motor vehicle between a drive unit and a first wheel axle and a second wheel axle is disclosed, the second wheel axle consisting at least of a first sub-axle and a second sub-axle, and the first and the second sub-axle being connected to a differential for torque distribution. The differential is an individual differential which is operatively connected to the drive unit via a drive shaft and which can optionally be operatively connected to the first wheel axle for torque distribution.

10 Claims, 6 Drawing Sheets

(51) Int. Cl.
  *B60K 17/35*   (2006.01)
  *F16H 37/08*   (2006.01)
  *F16H 48/10*   (2012.01)
  *F16H 48/22*   (2006.01)

(56) References Cited

U.S. PATENT DOCUMENTS

| | | | | |
|---|---|---|---|---|
| 6,726,591 | B2 * | 4/2004 | Maruyama | B60K 17/346 180/248 |
| 7,311,633 | B2 * | 12/2007 | Maruyama | B60K 17/3462 475/221 |
| 7,680,576 | B2 * | 3/2010 | Nagura | B60K 23/0808 180/197 |
| 8,727,927 | B2 | 5/2014 | Meixner | |
| 2002/0128117 | A1 | 9/2002 | Schroder et al. | |
| 2008/0035405 | A1 | 2/2008 | Oberhausen et al. | |
| 2010/0218632 | A1 | 9/2010 | Sasaki et al. | |

FOREIGN PATENT DOCUMENTS

| | | | |
|---|---|---|---|
| DE | 10 2006 014 932 | 4/2007 | |
| DE | 10 2006 038 358 | 2/2008 | |
| DE | 10 2011 086 061 | 5/2013 | |
| DE | 10 2012 021 513 | 5/2014 | |
| DE | 102014016077 A1 * | 5/2016 | ............ B60K 6/365 |
| EP | 1 238 847 | 9/2002 | |
| EP | 1 894 766 | 3/2008 | |
| EP | 2 368 742 | 9/2011 | |
| JP | S63-97432 | 4/1988 | |
| RU | 2 077 453 | 4/1997 | |
| SE | 126 044 | 9/1949 | |
| WO | WO 91/06787 | 5/1991 | |
| WO | WO 2012/152365 | 11/2012 | |

* cited by examiner

DRIVE TRAIN OF A MOTOR VEHICLE

CROSS-REFERENCES TO RELATED APPLICATIONS

This application is the U.S. National Stage of International Application No. PCT/EP2014/001943, filed Jul. 16, 2014, which designated the United States and has been published as International Publication No. WO 2015/014449 and which claims the priority of German Patent Application, Serial No. 10 2013 012 947.8, filed Aug. 2, 2013, pursuant to 35 U.S.C. 119(a)-(d).

BACKGROUND OF THE INVENTION

The invention relates to a drive train of a motor vehicle between a drive aggregate and a first wheel axle and a second wheel axle, wherein the second wheel axle consists of at least one first sub-axle and a second sub-axle, which are connected with a differential for distribution of a torque.

Such a drive train was proposed in the not yet published German patent application 10 2012 021 531.4 of the applicant. In order to reduce the space required by an axle differential on the second wheel axle and thus enable a compact configuration of the second wheel axle this drive train includes instead of an axle differential on the second wheel axle a dual differential arranged at a greater distance to the second wheel axle consisting of two operably connected planetary differentials. A first one of the two differentials serves as middle differential, which is operatively connected with a drive shaft originating from the and can be operatively connected with an output shaft leading to the first wheel axle, while the second differential serves as axle differential for the second wheel axle and is operatively connected with a first connecting shaft, which leads to the first sub-axle and with a second connecting shaft which leads to the second sub-axle.

The drive train serves for transmitting a torque between the drive aggregate of the motor vehicle and the at least two wheel axles. Thus the first wheel axle and also the second wheel axle are connected to the drive aggregate by the drive train. Both wheel axles are thus driven wheel axles and hence the motor vehicle is for example an all wheel drive motor vehicle. The first wheel axle is hereby for example a front axle of the motor vehicle while the second wheel axles is the rear axle of the motor vehicle. However, the opposite configuration is also possible. The two connecting shafts serve for transmitting the torque to the second wheel axle and distribute the torque to the two sub-axles. The connecting shafts are in particular configured as cardanic shafts.

SUMMARY OF THE INVENTION

In light of the foregoing the invention is based on the object to improve a drive train of the above-mentioned type to enable a more compact configuration of a drive train.

According to a first variant of the invention this is achieved with a drive train characterized by the features of the independent claim. Accordingly the differential is a single differential, which is operatively connected with the drive aggregate via a drive shaft and which can optionally be operatively connected for torque distribution with the first wheel axle. In other words instead of a dual differential only a single differential is used, which firstly is directly operatively connected with the drive shaft, secondly is connected with the first and the second sub-axle of the second wheel axle for torque distribution and which thirdly can optionally also be operatively connected with the first wheel axle for torque distribution.

A preferred embodiment of the invention provides that the first and the second sub-axles are connected for torque distribution with the differential by a first and a second connecting shaft and that the differential can optionally be connected with the first wheel axle for torque distribution via one or both connecting shafts and an output shaft.

This configuration of the invention is based on the rationale to connect the first wheel axle to the two connecting shafts which lead from the differential to the sub-axles of the second wheel axle or to connect them to the output of the differential so thus obviating the requirement for a dual differential and thus reducing the installation space required for the differential. Preferably the first wheel axle is not fixedly connected to the two connecting shafts so that an all wheel drive can be implemented when needed, wherein after the connection of the first wheel axle to the two connecting shafts the torque provided by the drive aggregate can be distributed differently to the wheels of the motor vehicle.

As a result of the feature combination of the first variant of the invention the drive aggregate is thus not only operatively connected via the drive shaft, the single differential and the first and second connecting shaft with the two sub-axles of the second wheel axle, but can also be operatively connected with the first wheel axle for torque distribution.

As in the drive shaft of the above-mentioned German patent application 10 2012 021 513.4 the torque distribution from the differential in the direction of the second wheel axle is preferably accomplished by means of two connecting shafts, which are advantageously constructed as cardanic shafts. The first connecting shaft is or can be hereby coupled with the first sub-axle of the second wheel axle. The second connecting shaft on the other hand can be or is coupled with the second sub-axle of the second wheel axle. Because the torque distribution to the two sub-axles occurs separate from each other via the connecting shafts, the differential can be relocated from the region of the second wheel axle, which enables reducing the required space.

The invention also relates to a motor vehicle with a drive train, which is preferably constructed as described above in the above. The motor vehicle has the first wheel axle and the second wheel axle wherein the second wheel axle consists of at least the first sub-axle and the second sub-axle.

In the preferred embodiment of the invention the motor vehicle is characterized by a first connecting shaft operatively connected with the first sub-axle, by a second connecting shaft operatively connected with the second sub-axle and by a single differential operatively connected with both connecting shafts, which differential is operatively connected with the drive aggregate or a transmission of the motor vehicle assigned to the drive aggregate via a drive shaft, and can be selectively operatively connected if needed with the first wheel axle via one or both connecting shafts and an output shaft for torque distribution. The single differential thus connects the drive shaft for torque distribution with the first and the second connecting shaft and can also connect the drive shaft with the output shaft via the first and/or second connecting shaft for torque distribution.

This means that for example equal amounts of a portion of the torque provided via the drive shaft are provided at the first and at the second connecting shaft and with this at the first or second sub-axle of the second wheel axle, when only the second wheel axle is to be driven. When also the first wheel axle is to be driven the respective torques provided at each of the two connecting shafts can partially be transmitted by the output shaft to the first wheel axle, selectively either each respective torque individually or both torques together. When the torque provided at both connecting shafts is transmitted to the first wheel axle, all wheels of the two wheel axles are driven with approximately equal torques, when the torque of the drive shaft is distributed in the differential in equal parts to the first and the second connecting shaft or to the two sub-axles of the second wheel axle.

In a preferred embodiment of the invention, the differential is a planetary gear differential with a sun gear, a ring gear and a planet carrier and with at least one planet gear meshing with the sun gear and the ring gear. The single differential thus has the known construction of a planetary gear train with a sun gear, a ring gear and advantageously multiple planet gears rotatably supported on the planet carrier, which mesh with the sun gear and with the ring gear.

Preferably the ring gear is directly connected with the drive aggregate via the drive shaft, while the sun gear is directly operatively connected with one of the two connecting shafts and the planet carrier is directly operatively connected with the other one of the two connecting shafts. The term direct operative connection means that the mentioned shafts are respectively directly connected with the respective element of the planetary gear differential.

In order to enable a selective connection of the drive shaft to one or both connecting shaft, the output shaft is connected to the two connecting shafts or corresponding outputs of the differential by two separate and independently activatable or shiftalbe clutches, wherein each of the two clutches directly operatively connects the drive shaft with one of the two connecting shafts or with the element of the planetary gear differential that is directly operatively connected with the respective connecting shaft, i.e., with the sun gear in the case of the one of the connecting shafts and with the planet gear in the case of the other one of the connecting shafts.

Advantageously one of the two clutches includes a clutch disc operatively connected with the one connecting shaft or the sun gear of the planetary differential, wherein at least two clutch rings that are operatively connected with the output shaft and are coaxial with the output shaft can be brought into coupling engagement against the outer circumference of the clutch disc from opposite sides. The other one of the two clutches on the other hand advantageously includes a clutch disc operatively connected with the other connecting shaft or with the planet carrier of the planetary differential, wherein also at least two clutch rings, which are connected with the output shaft in fixed rotative relationship with the output shaft, and are coaxial with the output shaft, can be brought in coupling engagement against the outer circumference of the other clutch from opposite sides.

The two clutches are open when only the second wheel axle is to be driven. When the first wheel axle is also to be driven with a relatively small torque, one of the two clutches is closed, whereby the torque provided at one of the wheels of the second wheel axle is partially transmitted to the first wheel axle via the closed clutch. When the first wheel axle is to be driven with a greater torque, both clutches are closed, whereby the torques provided at the two wheels of the second wheel axle are transmitted respectively partially to the first wheel axle via the closed clutches. By corresponding actuation of the clutches a torque can thus be shifted from the first and/or second sub-axle of the second wheel axle to the first wheel axle in a targeted manner. Actuation of both clutches blocks the differential. The clutches are advantageously constructed as friction clutches, which can also be closed at greater rotational speed differences. When such a friction clutch is controlled so that the clutches are not completely closed and a slip is present between the clutch elements, only a small torque is transmitted to the first wheel axle, which results in further possible variations of the torque vectoring or torque splitting.

As an alternative to the embodiments described above the separate or separately shiftable clutches can also be arranged between either of the two sub-axles and the first wheel axle so that selectively one or both sub-axles can be operatively connected with the first wheel axle. In this case advantageously one of the two clutches is arranged between an output shaft, which leads to the first wheel axle, and the first sub-axle and an element of the differential, which is operatively connected with the first sub-axle in fixed rotative relationship with the first sub-axle, while the other one of the two clutches is arranged between the output shaft and the second sub-axle and another element of the differential which is operatively connected with the second sub-axle.

An advantageous refinement of the invention provides that the planetary gear differential includes a dual planetary transmission in which the planet carrier has at least one radially outer outer-planet gear and at least one radially inner inner-planet gear, wherein the outer-planet gear meshes with the second ring gear and the inner-planet gear, while the inner-planet gear meshes with the outer-planet gear and the sun gear. The outer-planet gear and also the inner-planet gear are rotatably supported on the planet carrier. The outer-planet gear and the inner planet gear can be arranged in different angular positions relative to a rotary axis of the planet carrier.

Even though it is generally possible to arrange the two connecting shafts between the differential and the second wheel axel at lest in sections parallel adjacent each other it is advantageous when the first and the second connecting shaft acre arranged coaxial to each other, wherein one of the two connecting shafts is configured as a hollow shaft though which the other connecting shaft, which is configured as central shaft, extends. This enables on one hand to accommodate the two connecting shafts particularly space-efficiently and on the other hand avoids reducing the efficiency which would result in case of a parallel arrangement of the two connecting shafts due to the requirement of an additional spur gear or chain drive for connecting the connecting shaft, which is offset relative to the rotary axis of the sun gear and ring gear of the planetary gear differential.

In the case of a coaxial arrangement of the two connecting shafts according to another preferred embodiment of the invention, two oppositely acting axial bearings are arranged between the two coaxial connecting shafts so that the connecting shaft that is configured as central shaft, is indirectly supported in the connecting shaft that is configured as hollow shaft. This preferred configuration of the invention is not only advantageous in the above-described drive trains but also generally in wheel axles with two sub-axles that are driven by two coaxial connecting or cardanic shafts via a respective bevel gear transmission, and also in wheel axles with conventional transmissions in which two sub-axles are driven via bevel gear transmissions and two short coaxial connecting shafts are driven by an axle differential that is configured as planetary gear differential, so that this preferred configuration of the invention is at the same time also a second variant of the invention.

In this second variant of the invention the indirect support of the inner connecting or cradanic shaft, which is configured as central shaft, in the outer connecting or cardanic shaft, which is configured as hollow shaft, makes it possible that the axial forces mostly compensate each other.

A configuration of the first and the second variant of the invention provides that the crown wheel connected with the first sub-axle has an offset to one of the two bevel gear transmissions and the crown wheel connected with the second sub-axle has an offset to the other one of the two bevel gear transmissions in axial direction. In this case the crown wheels of the two bevel gear transmissions can have the same diameter, which allows increasing the number of parts that are the same.

Another configuration of the second variant of the invention on the other hand provides that the first and second sub-axle are each connected with the first and the second connecting shaft respectively via bevel gear transmissions with differently sized crown wheel diameters. In this case the first and second sub-axle can have aligned rotary axes in axial direction of the two connecting shafts. This has the advantage that one of the sub-axles can be extended by a support axle on which the crown wheel, which is connected the other sub-axle, can be supported via two axial bearings. This has the advantage that the axial meshing forces between the crown wheel and the pinion of each bevel gear transmission compensate each other and thus reduce load-dependent bearing losses.

BRIEF DESCRIPTION OF THE DRAWING

In the following the invention is explained in more detail by way of five embodiments shown in the drawing and several variants, without limiting the invention. It is shown in.

DETAILED DESCRIPTION OF PREFERRED EMBODIMENTS

Figure 1:
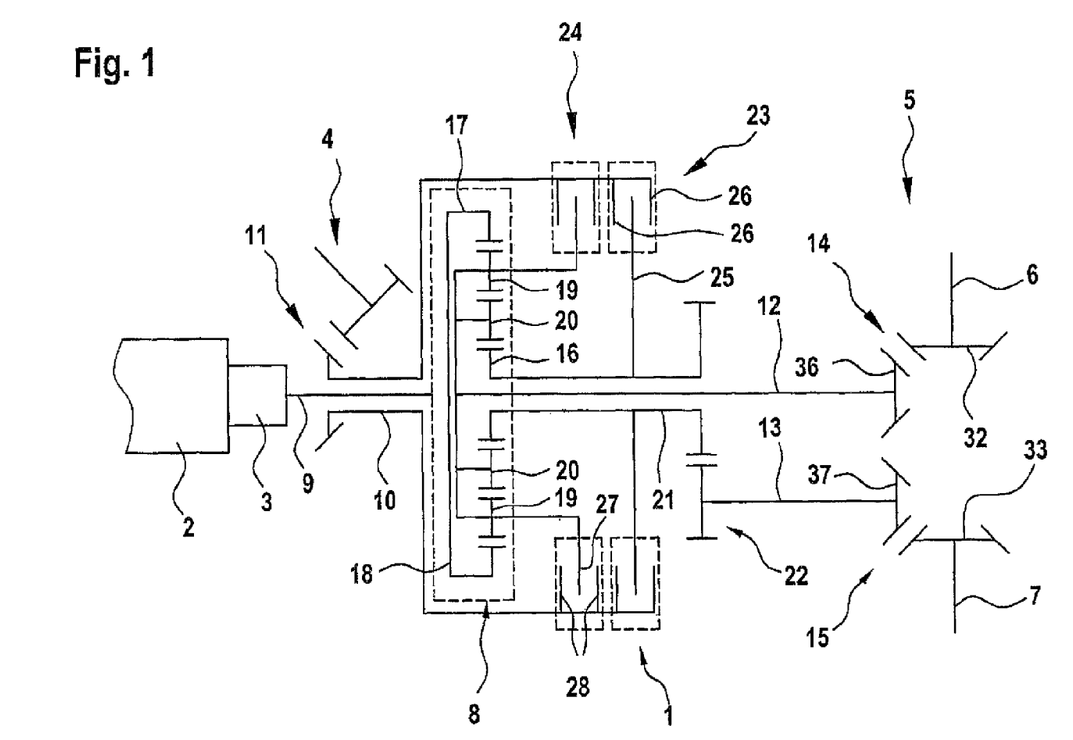
FIG. 1 a schematic representation of a first embodiment of a drive train according to the first variant of the invention.

FIG. 1 shows a first embodiment of a drive train 1 of a motor vehicle, which is here not further shown. The motor vehicle has a drive train 2, a transmission 3, a first wheel axle 4 configured as front axle and a second wheel axle 5 configured as rear axle, which are here only indicated schematically, wherein the second wheel axle 5 consists of at least one first sub-axle 6 and a second sub-axle 7. The drive train 1 has a planetary gear differential 8, which is operatively connected with the transmission 3 via a drive shaft 9. Between the differential 8 and the first wheel axle 4 an output shaft 10 is arranged, which is operatively connected with the first wheel axle 4 via a gearwheel stage 11.

Between the differential 8 and the second wheel axle 5 a first and a second connecting shaft 12, 13 are arranged, with the first connecting shaft 12 being operatively connected with the first sub-axle 6 via a first bevel gear transmission 14, and the second connecting shaft 13 being operatively connected with the second sub-axle 7 via a second bevel gear transmission 15.

The planetary gear differential 8, which is configured as dual planetary transmission, consists of a sun gear 16, a ring gear 17 and a planet carrier 18, on which multiple radially outer outer-planet gears 19 and multiple radially inner inner-planet gears 290 are rotatably supported. The outer-planet gears 19 mesh with the ring gear 17 and with the inner-planet gears 20. The inner-planet gears 20 mesh with the outer-planet gears 19 and with the sun gear 16. With this the planet carrier 18 and also the sun gear 16 are rotatively driven by a rotation of the ring gear 17.

The ring gear 17 of the planetary gear differential 8 is connected with the drive shaft 9 and via the drive shaft with the transmission 3 and the drive aggregate 2. The planet carrier 18 is connected to the first connecting shaft 12 in fixed rotative relationship with the first connecting shaft. The sun gear 16 is operatively connected with the connecting shaft 13 via an output shaft 21, which is configured as a hollow shaft, and a gearwheel stage 22 with spur gear teeth. The first connecting shaft 12 is coaxial with the output shaft 21 and extends through the output shaft.

Between the output shaft 21 and the output shaft 10 a first clutch 23 is arranged by which the second connecting shaft 13 can be operatively connected with the output sahft 10 via the gearwheel stage 2 and the output shaft 21. Between the planet carrier 18 and the output shaft 10 a second clutch 24 is arranged by which the first connecting shaft 12 can be operatively connected with the output shaft 10 via the planet carrier 18. The two clutches 23 and 24 are friction clutches and are open when only the wheels of the second wheel axle 5 are to be driven. The two clutches 23 and 24 are arranged on the side of the differential 8 neighboring the wheel axle 5.

The clutch 23 includes a clutch disc 25, which is connected with the transmission output shaft 21 in fixed rotative relationship with the transmission output shaft, and against which two clutch rings 26 can be pressed from opposite sides when closing the clutch 23. The clutch 24 includes a clutch disc 27, which is connected with the planet carrier 18 in fixed rotative relationship with the planet carrier, and against which two clutch rings 28 can be pressed from opposite sides when closing the clutch 24. The clutch rings 26 and 28 are in fixed rortative relationship with each other and with the output shaft 10.

When the first wheel axle 4 is also to be driven with a relatively small torque, only the clutch 23 or only the clutch 24 is closed. When only the clutch 23 is closed the torque provided to the first sub-axle 7 is partially redirected or transmitted via the clutch 23 to the first wheel axle 4. When only the clutch 24 is closed the torque delivered from the drive aggregate to the second sub-axle 6 is partially transmitted or redirected to the first wheel axle 4 via the clutch 24. When the first wheel axle 4 is to be driven with a greater torque, both clutches 23 and 24 are closed. In this case the torque delivered by the drive aggregate 2 to the two sub-axles 6 and 7 is respectively partially transmitted or redirected to the first wheel axle 4 via the two clutches 23 and 24. In this case the differential 8 is blocked. Closing the clutches 23, 24 thus enables a torque splitting between the first wheel axle 4 and the second wheel axle 5.

Figure 2:
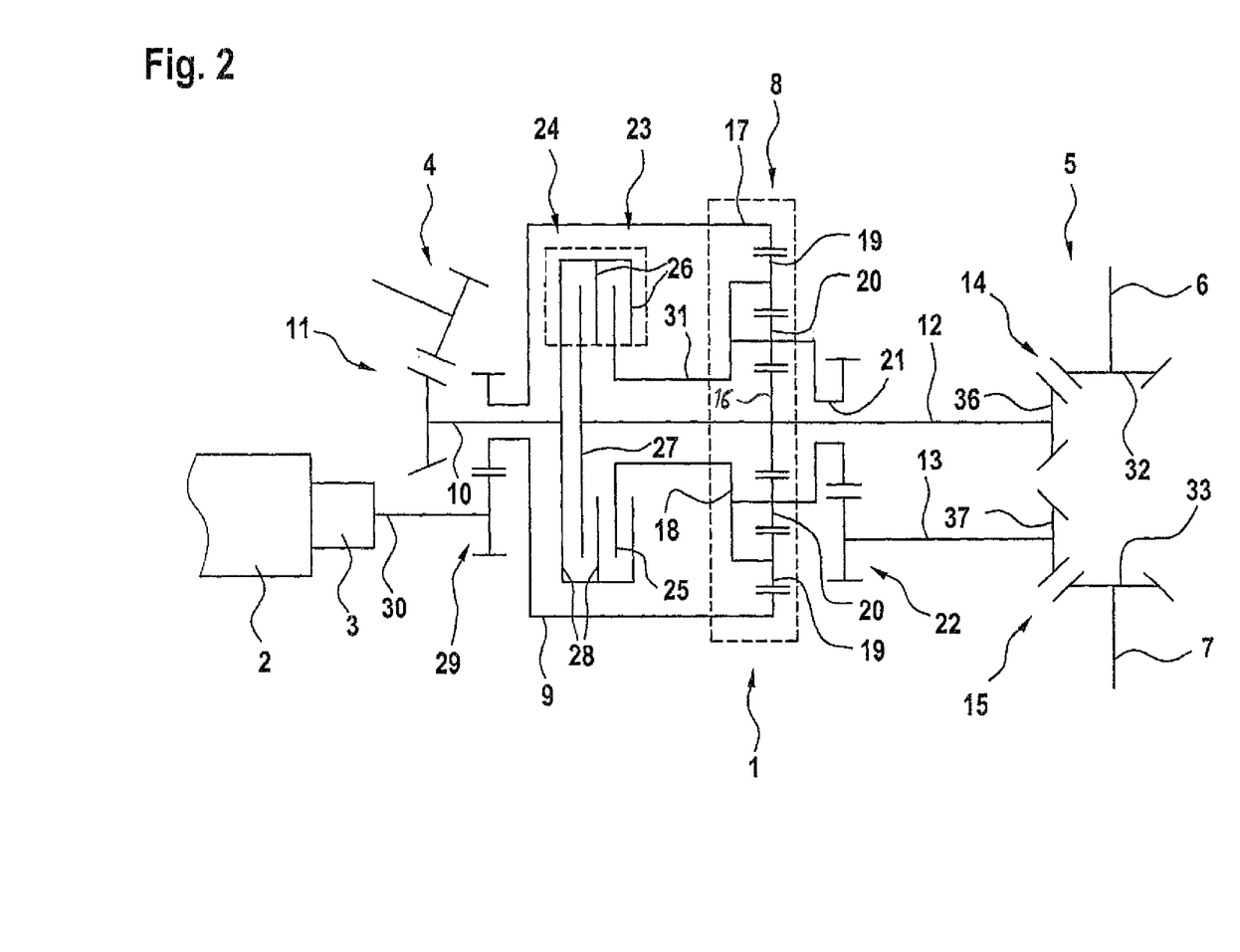
FIG. 2 a schematic representation of a second embodiment of a drive train according to the first variant of the invention FIG. 3 a schematic representation of a third embodiment of a drive train according to the first variant of the invention.

While in the first embodiment shown in FIG. 1 the output shaft 10 is configured as a hollow shaft though which the drive shaft 9 passes as central shaft, the output shaft 10 in the second embodiment shown in FIG. 2 extends as central shaft through the drive shaft 9, which is configured as a hollow shaft and which in this case is operatively connected with the output shaft 30 of the transmission 3 via an additional transmission stage 29 with spur gear teeth.

In the second embodiment the two clutches 23 and 24 are additionally arranged on the side of the differential 8 neighboring the wheel axle 4. The first clutch 23 is arranged between the output shaft 10 and a further output shaft 31 of the differential 8, which output shaft 31 is connected with the planet carrier 18 in fixed rotative relationship with the planet carrier, and is operatively connected with the connecting shaft 13 via the planet carrier 18, the inner-planet gears 20, the output shaft 21 and the gearwheel stage 22. The second clutch 24 is arranged between the output shaft 10 and the first connecting shaft 12, which extends through the differential 8 and is connected with the sun gear 16 in fixed rotative relationship with the sun gear. The remaining features of the second embodiment essentially correspond to those of the first embodiment.

When in the second embodiment the clutch 23 is closed, the torque provided from the drive aggregate 2 to the second sub-axle 7 is partially redirected to the first wheel axle 4 via the clutch 23. When the clutch 24 is closed the torque provided by the drive aggregate 2 to the first sub-axle 6 is partially redirected to the first wheel axle 4 via the clutch 24.

Figure 3:
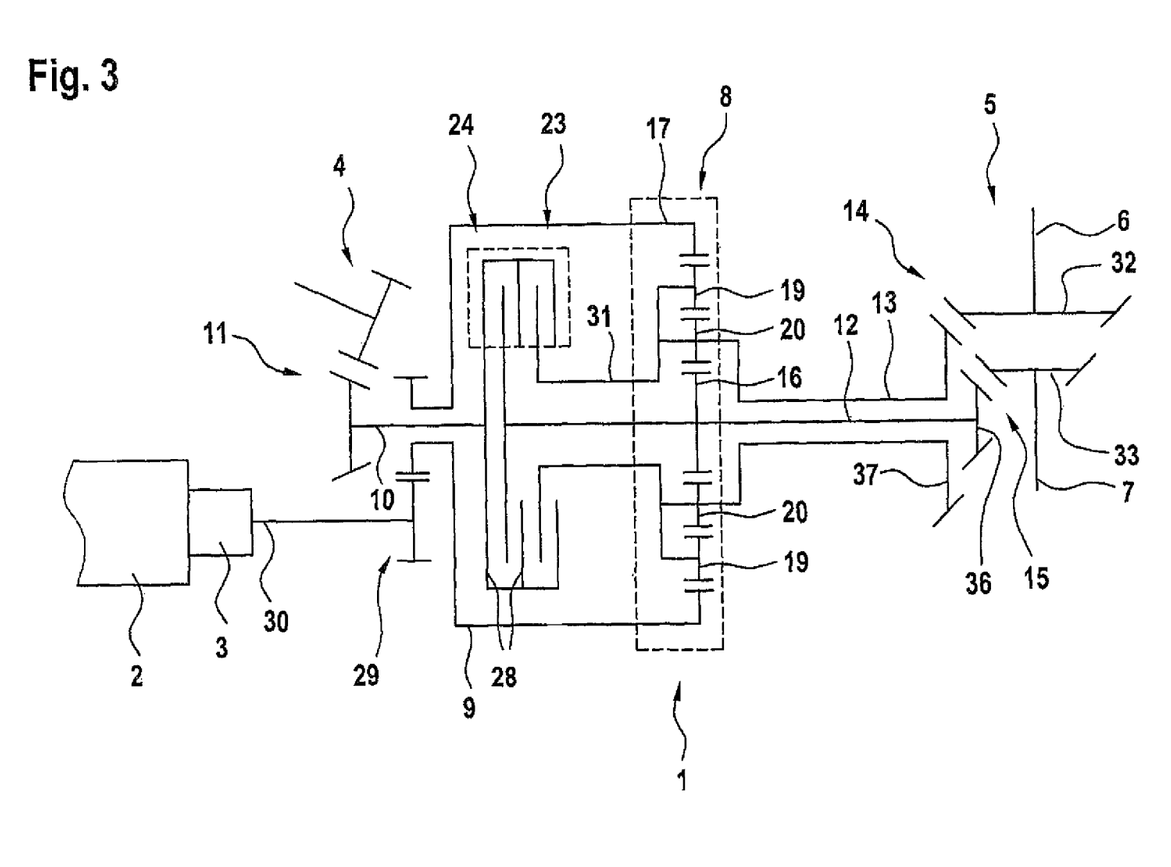

The embodiment shown in FIG. 3 corresponds to the embodiment of FIG. 2 with the exception of the part of the drive train 1 arranged between the differential 8 and the two sub-axles 6 and 7. In order to reduce the required space of the drive train 1 between the differential 8 and the sub-axles and to increase the efficiency, in the embodiment of FIG. 3 the two connecting shafts 12, 13 are configured coaxial relative to each other wherein the shaft 13 is configured as hollow shaft though which the shaft 12 extends. In addition in this embodiment the crown wheels 32, 33 of both bevel gear transmissions 14, 15, which are connected with the two sub-axles 6 and 7 in fixed rotative relationship with the sub-axles 6 and 7, have bevel gears which are slanted in the same direction, in contrast to the embodiments described above where the direction of the slant of the bevel gears of the crown wheels 32, 33 is different.

Figure 4:
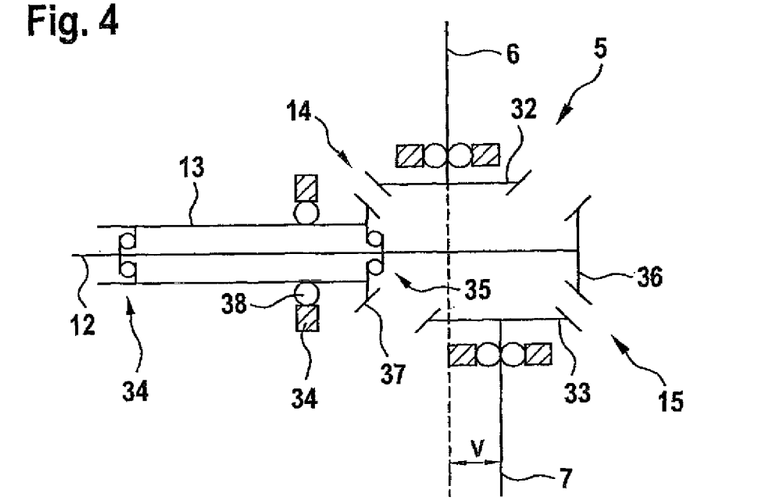
FIG. 4 a schematic representation of parts of a fourth embodiment of a drive train according to the first and second variant of the invention.
Figure 5:
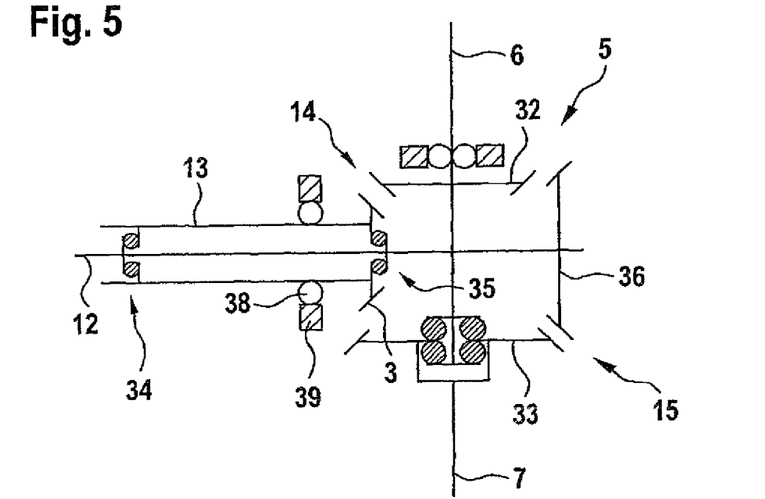
FIG. 5 a schematic representation according to FIG. 4, however of one variant.

FIGS. 4 and 5 show two variants of the third embodiment, which may not only be used in the afore-described drive train 1 but generally in drive trains 1 with two coaxial cardanic or connecting shafts 12, 13.

As shown in FIGS. 4 and 5, two axial bearings 34 35 are arranged between the connecting shaft 13, which is configured as hollow shaft, and the connecting shaft 12, which is configured as central shaft, in which axial bearings the connecting shaft 12 is supported in the connecting shaft 13. The connecting shaft 13 in turn is supported in at least one bearing 38 in relation to a surrounding housing 39 so that the connecting shaft 12 is indirectly supported in the housing 39. Hereby the connecting shaft 12 is supported in the two axial bearings 34, 35 in opposite directions, whereby the occurring axial forces compensate each other to the most degree.

While in the variant in FIG. 4 the crown wheels 32, 33 of the bevel gear transmissions 14, 15, which are connected with the sub-axles 6 or 7 of the second heel axle 5 in fixed rotative relationship with the sub-axles 6 or 7, have an axial offset in axial direction of the two connecting shafts 12, 13 but same diameters, in the variant in FIG. 5 the crown wheels 32, 33 and with this also the pinions 36, 37 of the two bevel gear transmissions 14, 15, which are connected with the connecting shafts 12, 13 in fixed rotative relationship with the connecting shafts 12, 13, have different diameters while the crown wheels 32, 33 of the sub-axles 6 and 7 of the second wheel axle 5 are aligned with each other. In the variant of FIG. 5 an additional support shaft 40, which is connected in fixed rotative relationship with the sub-axle 6 and with the crown wheel 32, is provided, extends past the crown wheel 32 up to the crown wheel 33 where the latter is supported in two opposite axial bearings 41, 42 on the support shaft 40. This also enables a compensation of the axial forces of the crown wheels so that only the resulting axial forces are introduced into the bearings 38 fixedly connected to the housing. In order to make it possible to guide the support shaft 40 past the connecting shaft 12, the bevel gear transmissions 14, 15 in the variant in FIG. 5 have a hypoid offset in the direction of the vertical axis of the motor vehicle of at least 25 to 30 mm.

Figure 6:
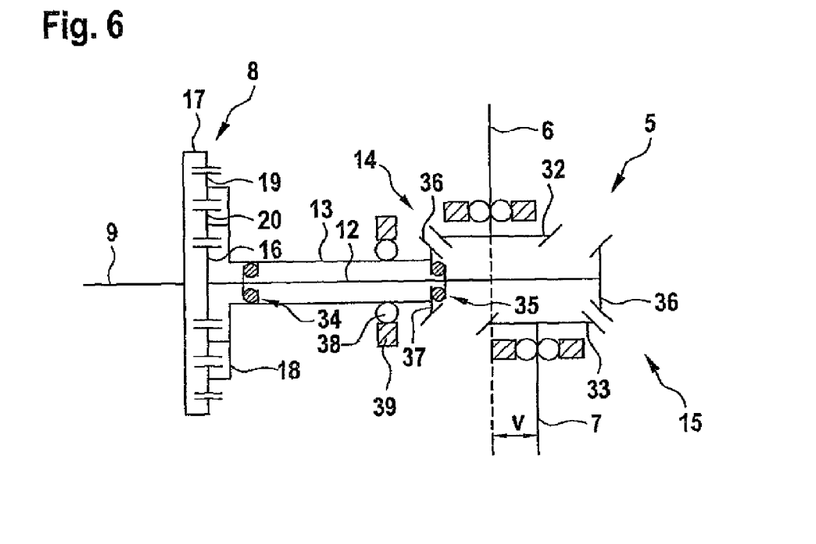
FIG. 6 a schematic representation of parts of an embodiment of a drive train according to the second variant of the invention.
Figure 7:
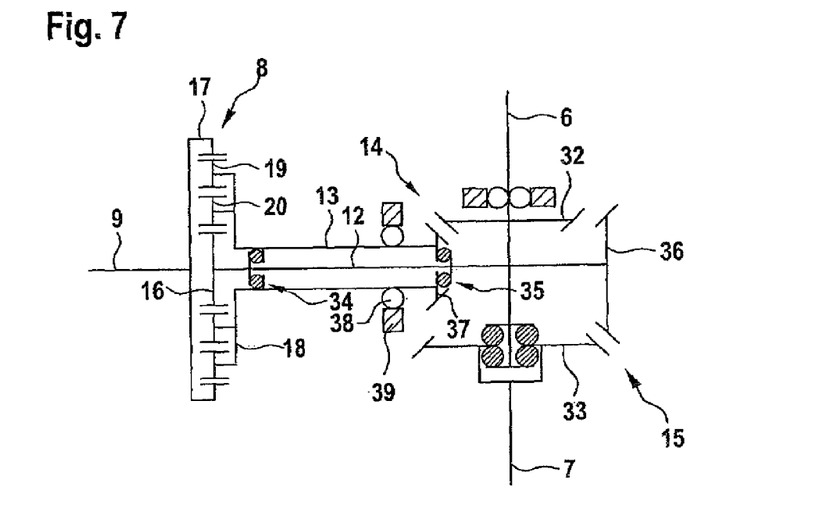
FIG. 7 a schematic representation corresponding to FIG. 6 however of one variant.

FIGS. 6 and 7 show two variants of a conventional second wheel axle 5 or rear axle with two sub-axles 6, 7 and a differential 8, which is configured as planetary gear differential, and which is operatively connected with the pinions 36, 37 of two bevel gear transmissions 14, 15 via two short coaxial connecting shafts 12, 13, with the crown wheels of 32, 33 of the two bevel gear transmissions 14, 15 being connected with the two sub-axles 6, 7.

As in FIG. 4, in the variant in FIG. 6 the two crown wheels 32, 33 again have an offset V in axial direction of the connecting shafts 12, 13 and have same diameters. In the variant in FIG. 7 the crown wheels 32, 33, as in FIG. 5, have different-sized diameters, while the crown wheels 32, 33 of the sub-axles 6 and 7 are aligned with each other. Also in this case an additional support axle 40 is provided between the sub-axle 6 and the crown wheel 33, on which the crown wheel 3 is supported in two axial bearings 41, 42 in order to compensate the axial forces of the crown wheel. Also in this case the bevel gear transmissions 14, 15 have a hypoid offset in the direction of the vertical axis of the motor vehicle of at least 25 to 30 mm.

Figure 8:
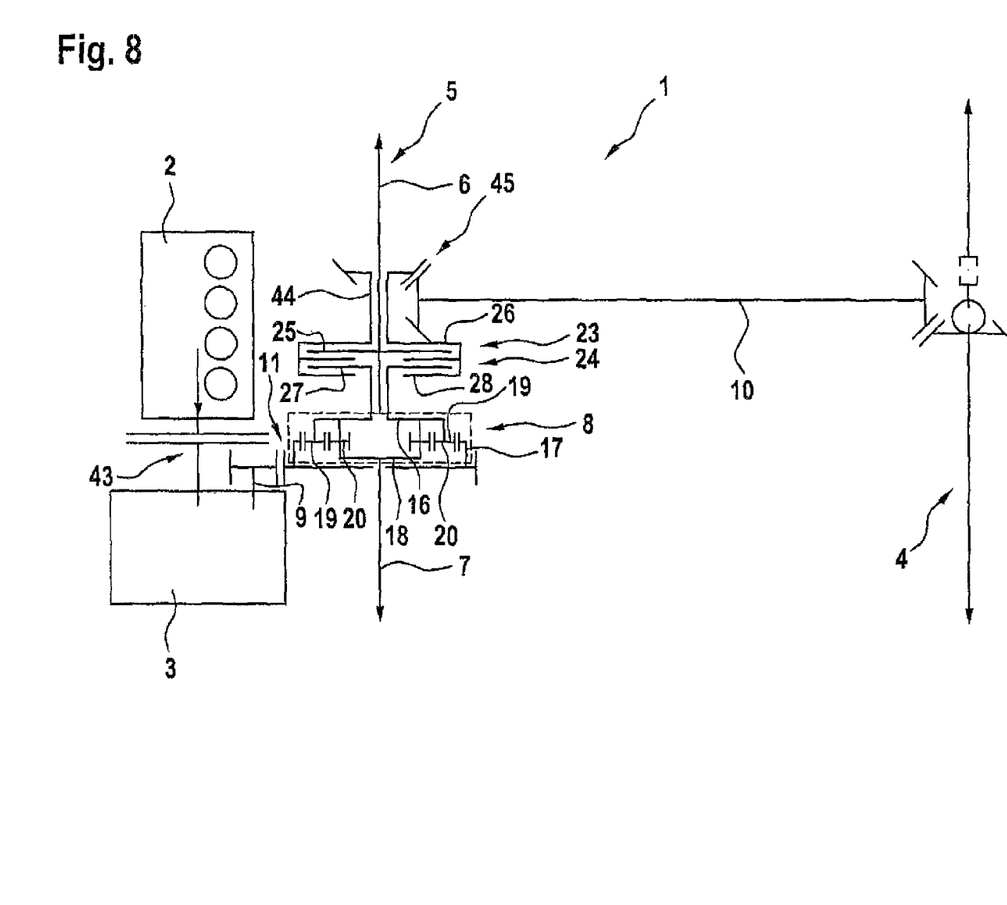
FIG. 8 a schematic representation of a fifth embodiment of a drive train according to the first variant of the invention.

FIG. 8 shows a fifth embodiment of the drive train 1, which is provided for a motor vehicle with a transversely mounted drive aggregate 2 and a DQ or MQ transmission 3, wherein a further clutch 43 is provided between the drive aggregate 2 and the transmission 3. In contrast to the embodiments in FIGS. 1 to 3, the drive train 1 in FIG. 5 has a first wheel axle 4 configured as rear axle and a second wheel axle 5 configured as front axle. The first wheel axle 4 can be activated or deactivated if needed, while the second wheel axle 5 consists of at least one first sub-axle 6 and a second sub-axle 7. In contrast to the embodiment in FIGS. 6 and 7, the differential 8 is not a rear axle differential but a front axle differential arranged in the region of the second wheel axle 5, which is operatively connected with the transmission 3 by a drive shaft 9 and a gearwheel stage 11 as in the differentials 8 described above.

Between the differential 8 and the first wheel axle 4, an output shaft 10 is arranged, which can selectively be coupled or operatively connected with the first sub-axle 6 or with the second sub-axle 7 by means of two clutches 23, 24, in order to partially transmit the torque provided by the drive aggregate at the first sub-axle 6 and/or the second sub-axle 7 to the first sub-axle 4. As above, the two clutches 23 or 24 are friction clutches each including a clutch disc 25 or 27 and two clutch rings 26 or 28, which when closing the clutch 23 or 24 are pressed from opposite sides against the associated clutch disc 25 or 27. The clutch rings 26, 28 of the two clutches 23, 24 are connected to each other in fixed rotative relationship. The two clutches 23 24 have a common output shaft 44, which is connected with the clutch rings 26, 28, via which a bevel gear transmission 45 is connected with the output shaft 10, which extends in longitudinal direction of the motor vehicle. The output shaft 10 can be configured as cradanic shaft.

As described above, the differential 8 is configured as dual planet gear transmission and consists of a sun gear 16, a ring gear 17 and a planet carrier 18, on which multiple radially outer outer-planet gears 19 and multiple radially inner inner-planet gears 20 are rotatably supported. The outer-planet gears 19 mesh with the ring gear 17 and with the inner-planet gears 20. The inner-planet gears 20 mesh with the outer-planet gears 19 and the sun gear 16.

The ring gear 17 is driven by the drive shaft 9 via the gearwheel stage 11. The sun gear 16 is connected with the first sub-axle 6 and with the clutch disc 25 of the first clutch 23 in fixed rotative relationship. The planet carrier 18 is connected with the other sub-axle 7 and with the clutch disc 27 of the second clutch 24 in fixed rotative relationship.

When in the fifth embodiment the clutch 23 is closed, the torque delivered by the drive aggregate 2 to the first sub-axle 6 is partially redirected to the first wheel axle 4 via the clutch 23, the output shaft 44, the bevel gear transmission 45 and the drive shaft 10. When the clutch 24 is closed the torque delivered by the drive aggregate 2 to the second sub-axle 7 is partially redirected to the first wheel axle 4 via the clutch 24. When the first wheel axle 4 is also to be driven with a greater torque, both clutches 23 and 24 are closed. In this case the torque delivered by the drive aggregate 2 to both sub-axles 6 and 7 is partially transmitted or redirected to the first wheel axle 4. In this case again the differential is blocked. Closing the clutches 23, 24 thus also enables in this case a torque splitting between the first wheel axle 4 and the second wheel axle 5.

What is claimed is:

1. A drive train of a motor vehicle arranged between a drive unit and a first wheel axle and a second wheel axle, said second wheel axle comprising at least one first sub-axle and at least one second sub-axle, said drive train comprising:
    an individual differential constructed as a planetary gear differential and comprising a sun gear, a ring gear and a planet carrier, said planet carrier having planet gears meshing with the sun gear and the ring gear, said individual differential being operatively connected with the drive unit via a drive shaft and with the first and second sub-axle for torque distribution between the first and second sub-axle and being operatively connectable to the first wheel axle for torque distribution between the first wheel axle and the second wheel axle;
    a first connecting shaft and a second connecting shaft, said ring gear operatively connected with the drive shaft, said sun gear operatively connected with one of the first and the second connecting shaft, said planetary carrier operatively connected with the other one of the first and second connecting shaft; and
    two separately shiftable clutches, with a respective one of the two clutches being arranged between each of the first and second connecting shaft and the first wheel axle.

2. The drive train of claim 1, wherein the individual differential is connected with the first and the second sub-axle by a first and a second connecting shaft for distribution of the torque, and wherein the differential is configured so as to be selectively operatively connectable with the first wheel axle via one or both of the connecting shafts and an output shaft for torque distribution between the first wheel axle and the second wheel axle.

3. The drive train of claim 1, wherein the planet carrier has at least one outer-planetary gear and at least one inner-planetary gear, which mesh with each other, wherein the outer planet-gear meshes with the ring gear and the inner-planet gear meshes with the sun gear.

4. The drive train of claim 1, wherein one of the two clutches is arranged between the output shaft and the one of the first and second connecting shafts or an element of the individual differential operatively connected with the one of the first and second connecting shafts, and wherein the other one of the two clutches is arranged between the output shaft and the other one of the first and second connecting shafts or another element of the individual differential operatively connected with other one of the first and second connecting shafts.

5. The drive train of claim 1, wherein the respective two clutches are arranged between each of the two sub-axles and the first wheel axle.

6. The drive train of claim 5, wherein one of the two clutches is arranged between the output shaft and the first sub-axle and an element of the differential, which is operatively connected with the first sub-axle in fixed rotative relationship, and wherein the other one of the two clutches is arranged between the output shaft and the second sub-axle and another element of the differential, which is operatively connected with the second sub-axle.

7. The drive train of claim 1, wherein the first and the second connecting shaft or the output shaft are constructed as cardanic shafts.

8. The drive train of claim 1, further comprising a first bevel gear transmission operatively connecting the first connecting shaft with the first sub-axle and a second bevel gear transmission connecting the second connecting shaft with the second sub-axle, wherein the first and second connecting shafts are arranged coaxial relative to each other and wherein two oppositely acting axial bearings are arranged between the first and the second connecting shaft.

9. The drive train of claim 8, wherein the first and second bevel gear transmissions each have a crown wheel, wherein a diameter of the crown wheel of the first bevel gear transmission is different from a diameter of the crown wheel of the second bevel gear transmission.

10. The drive train of claim 8, wherein the crown wheel of one of the first and second bevel gear transmissions is supported via two axial bearings on a support shaft, which is connected with the crown wheel of the other one of the first and second bevel gear transmissions in fixed rotative relationship.

* * * * *

UNITED STATES PATENT AND TRADEMARK OFFICE
CERTIFICATE OF CORRECTION

Page 1 of 2

PATENT NO. : 9,669,710 B2
APPLICATION NO. : 14/909406
DATED : June 6, 2017
INVENTOR(S) : Christian Meixner It is certified that error appears in the above-identified patent and that said Letters Patent is hereby corrected as shown below:

Please insert the following corrected drawing sheet as shown on the attached page.

Signed and Sealed this
First Day of January, 2019

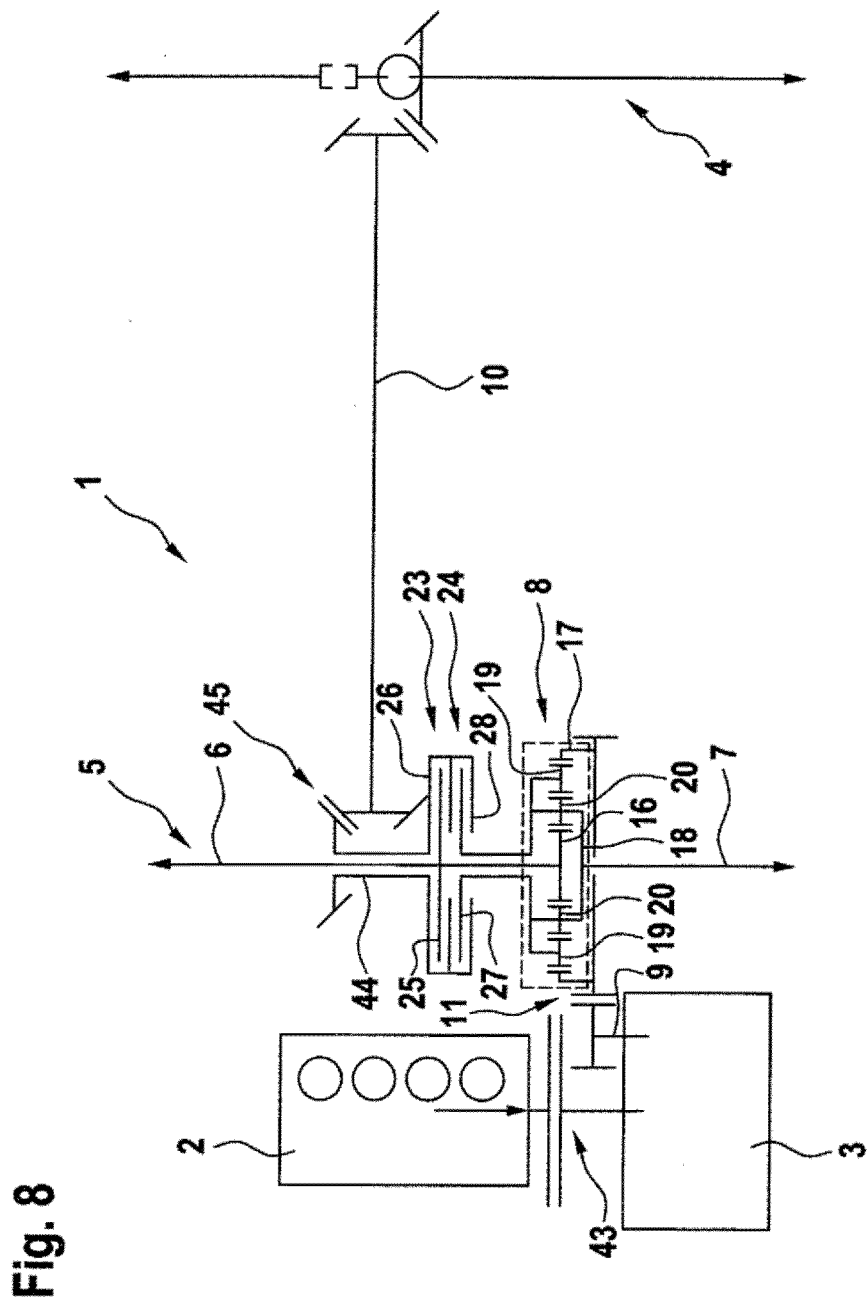

Andrei Iancu
*Director of the United States Patent and Trademark Office*